United States Patent [19]
Fennema

[11] 3,716,164
[45] Feb. 13, 1973

[54] BERRY BASKET AND COVER

[76] Inventor: Everett Fennema, 9607-57 Street, Edmonton, Alberta, Canada

[22] Filed: Aug. 24, 1970

[21] Appl. No.: 66,281

[52] U.S. Cl................................220/60 R, 206/45.34
[51] Int. Cl. ..............................................B65d 43/10
[58] Field of Search.....229/43; 206/45.34; 220/60 R; 312/284

[56] References Cited

UNITED STATES PATENTS

| 2,591,276 | 4/1952 | Middleton et al. | 260/45.34 |
| 2,731,999 | 1/1956 | Burns | 220/60 R |
| 3,067,039 | 12/1962 | Crane | 229/43 X |
| 3,351,227 | 11/1967 | Collie | 220/60 R |

FOREIGN PATENTS OR APPLICATIONS 682,381   3/1964   Canada..........................229/DIG. 14

Primary Examiner—Joseph R. Leclair
Assistant Examiner—James R. Garrett
Attorney—Ernest Peter Johnson

[57] ABSTRACT

A plastic lattice-work berry basket having a novel locking arrangement is provided. A T-shaped slot network is cut in each corner of the cover. The basket top ridge is provided with sharp, outwardly projecting corners. These corners each engage the vertical slot of one of the networks when the cover is pushed onto the basket. The vertical slots guide the corners into the horizontal slots, into which they snap to lock the basket and cover together.

5 Claims, 4 Drawing Figures

PATENTED FEB 13 1973 3,716,164
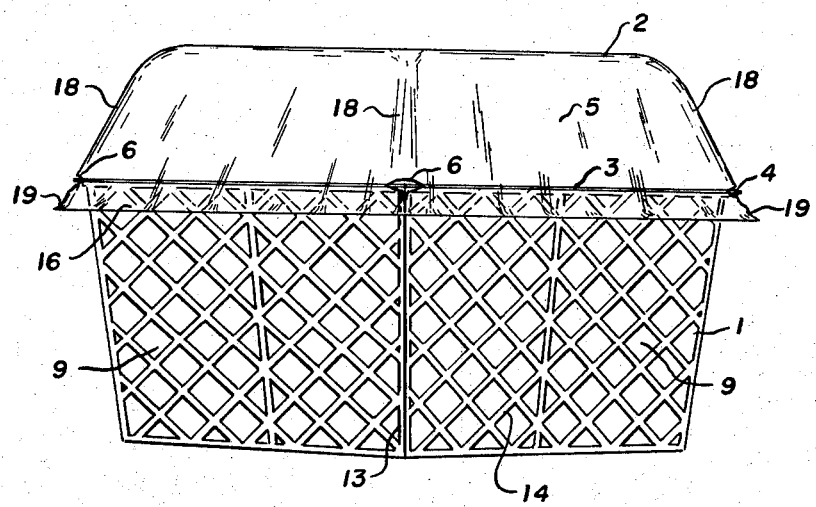
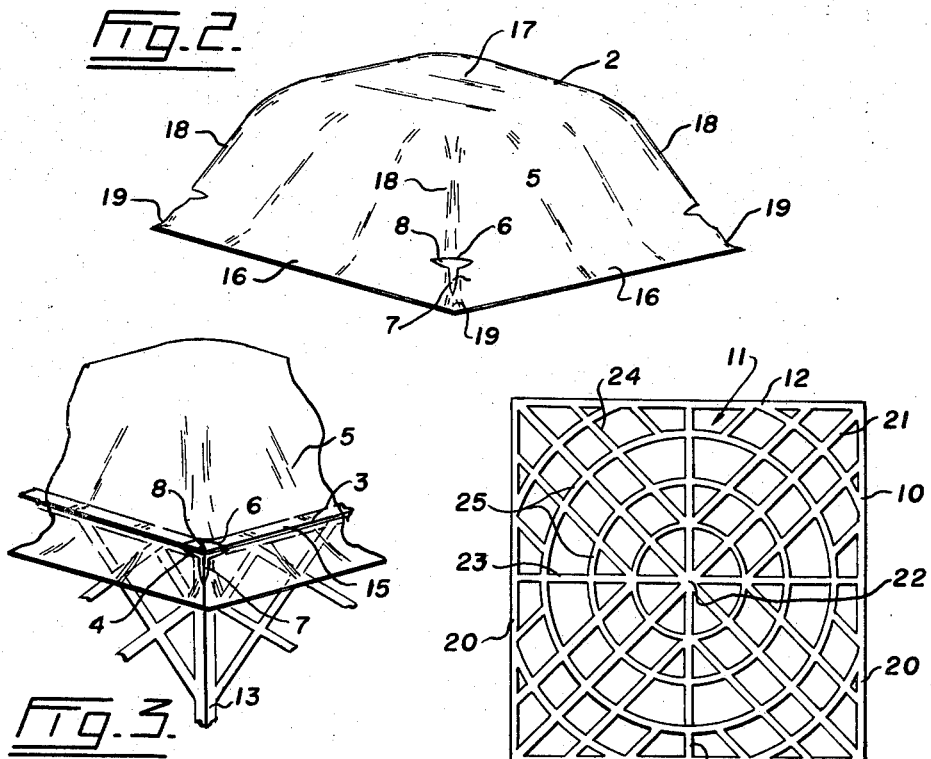
INVENTOR,
EVERETT FENNEMA
AGENT:
Ernest Peter Johnson

BERRY BASKET AND COVER

BACKGROUND OF THE INVENTION

This invention relates to a pre-formed plastic basket and a cover therefor. More particularly it relates to a basket and cover which are adapted to lock together.

Produce, such as strawberries and grapes, is commonly packaged in lattice-work plastic baskets. A cover is provided with each basket to prevent spillage and handling of the goods. The usual cover is a square of plastic film secured over the mouth of the basket with a rubber band.

There are two disadvantages in using such a cover in this context. Firstly, the cost of manually securing the cover in place is relatively high. Secondly, the produce is sometimes damaged when baskets are piled one upon another; the film, of course, is not rigid and cannot protect the basket contents from weight above.

SUMMARY OF THE INVENTION

It is therefore an object of this invention to provide a plastic cover having locking means associated therewith adapted to cooperate with locking elements on the basket to secure the cover and basket together by a simple movement.

It is another object to provide a cover of this type which is dome - shaped and semi-rigid to protect the basket contents.

According to the invention, the basket is made with a semi-rigid retaining top-ridge which provides sharp, outwardly protruding, horizontal corners. The semi-rigid, dome - like cover is formed with T-shaped slot networks cut in its corners. To lock the cover to the basket, it is pushed down over the basket, keeping their respective corners aligned. Each ridge corner penetrates the upwardly extending slot of a network and slides upwardly therein, thereby being guided into the horizontal slot. The corners snap into the horizontal slots and are locked in place. As described, the connection is made by the simple movement of squeezing the basket and cover together. Once in place, the cover provides protection from top-loads.

The novel basket cover is semi-rigid and dome - like in form. Preferably, it is of generally rectangular shape having an upwardly tapered side wall and a horizontal top wall integral therewith. The side wall defines a plurality of spaced slot networks. Each such network comprises an upwardly directed first slot and a substantially horizontal second slot communicating with the first slot adjacent its upper end. The second slots are disposed in a common horizontal plane located intermediate the top and bottom of the side wall. Preferably each slot network is T-shaped, having the first slots aligned with the corner diagonals of the cover.

The basket is provided with outwardly projecting, substantially horizontal corners. These corners may be provided by the semi-rigid ridge already mentioned or by semi-rigid tabs or like elements connected to the basket. The basket is preferably of generally rectangular form, having a lattice bottom wall and outwardly tapering lattice side walls.

The term "corner" as used herein is intended to cover semi-rigid, outwardly extending, substantially horizontal elements such as tabs, lugs and the like.

The term "substantially rectangular" when used in describing the shape of the cover and basket is to be given a broad interpretation. As shown in the drawings, these structures can be tapered to give structural strength. The term "many-sided" when used in describing the cover is intended to mean three or more sides.

DESCRIPTION OF THE DRAWINGS

FIG. 1 is a perspective view of the basket and cover locked together;

FIG. 2 is a perspective view of the cover showing slot networks at the corners;

FIG. 3 is a perspective view of a corner segment of the basket and cover showing a ridge corner inserted in the network.

FIG. 4 is a plan view of the bottom wall of the basket.

DESCRIPTION OF THE PREFERRED EMBODIMENT

With reference to FIG. 1, a basket 1 is shown locked to a cover 2. The retaining top ridge 3 of basket 1 has horizontal corners 4. The side wall 5 of cover 2 defines slot networks 6 at each of its rounded corners 18. Each network 6 comprises an upwardly directed first slot 7 and a horizontal second slot 8. The locking elements or corners 4 extend through and are locked in the second slots 8.

In greater detail, the basket 1 shown is an injection - moulded berry basket used for packaging strawberries. It is made from high impact polystyrene. Its side walls 9 taper upwardly and outwardly from a square bottom wall 10. This bottom wall 10 is comprised of a lattice of filaments 11 bounded by a semi-rigid retaining edge 12. Upwardly directed, semi-rigid corner edges 13 connect the corners of the top ridge 3 and bottom edge 12. Diagonal lattice filaments 14 connect the boundary members of each side wall 9.

The semi-rigid top ridge 3 includes a horizontal, outwardly projecting lip 15. This lip provides the sharp corners 4 which function as the cover's locking elements.

Turning now to the cover 2, it comprises a dome - like structure of substantially rectangular form. It is made up of a side wall 5, outwardly extending ledge 16 and top wall 17. The embodiment shown derives its rigidity in large part from its upward taper, rounded corners 18, 19 and ledge 16.

The T-shaped networks 6 are cut into the cover side wall 5 at the corners 18. They are located intermediate the top and bottom of the cover 2.

The cover 2 may be thermally formed from material such as 10 mill sheet of clear, oriented polystyrene. The slots 7, 8 can be cut using a hot wire.

In an additional feature of the invention, the quadrilateral bottom wall 10 of the basket is formed with a novel lattice. This lattice includes the edge 12 formed of side elements 20. The diagonal filaments 21 connect the opposed corners of edge 12 and pass through the central sprue 22. The perpendicular filaments 23 each connect the mid-points of a pair of opposed side elements 20 and pass through the sprue 22. Reinforcing filaments 24, which are spaced from but parallel to the diagonal filaments 21, each connect two or more circular filaments 25. These circular filaments 25 are concentric about the sprue 22 and connect the diagonal and perpendicular filaments 21, 23. The filaments 21, 23, 24 and 25 are all disposed in a common place.

This lattice pattern is advantageous in that it is characterized by even flow at relatively low pressure during moulding.

In operation, the cover 2 is pushed down onto basket 1. The corners 4 engage the upwardly directed slots 7 and are guided to the horizontal slots 8, through which they snap into a locked position.

What is claimed is:

1. A pre-formed semi-rigid plastic basket cover having a dome of generally rectangular form comprising an upwardly tapered side wall and a top wall integral therewith, said side wall having a slot network at each corner intermediate its top and bottom edges, each such slot network comprising an upwardly directed first slot and a substantially horizontal second slot communicating with the said first slot at its upper end.

2. The cover of claim 1 wherein:
   the top wall is horizontal;
   and each network is T-shaped, the said first slots being aligned with the corner diagonals of the cover.

3. The cover of claim 1 wherein:
   the second slots are disposed in a common horizontal plane located intermediate the top and bottom of the side wall.

4. In combination:
   a plastic lattice basket of substantially rectangular form having a semi-rigid retaining top ridge, said ridge having outwardly and substantially horizontally projecting corners; and
   a pre-formed semi-rigid cover having a dome comprising:
   an upwardly tapered side wall of substantially rectangular form having rounded corners; and
   a horizontal top wall integral with the side wall;
   said side wall having a slot network at each rounded corner intermediate the top and bottom edges of the side wall, each said network comprising an upwardly directed first slot aligned with the corner diagonal of the cover and a horizontal second slot communicating with the first slot at its upper end, said second slots being disposed in a common horizontal plane;
   said slot networks being positioned so that when the cover is pushed down over the basket with their respective corners aligned, each ridge corner engages a first slot and slides up in it to engage the corresponding second slot to lock the cover to the basket.

5. A pre-formed semi-rigid basket cover having a generally frusto-pyramidal dome comprising an upwardly tapered side wall and a top wall integral therewith, said side wall having a slot network at each corner intermediate its top and bottom edges, each such slot network comprising an upwardly directed first slot and substantially horizontal second slot communicating with the first slot at its upper end.

* * * * *